UNITED STATES PATENT OFFICE.

BRUNO KNIFFLER, OF WINCHESTER, MASSACHUSETTS, ASSIGNOR TO VERA CHEMICAL COMPANY, OF STONEHAM, MASSACHUSETTS, A CORPORATION.

WATERPROOF COMPOSITION FOR COATING PAPER.

1,266,955.      Specification of Letters Patent.      Patented May 21, 1918.

No Drawing.      Application filed November 22, 1913. Serial No. 802,519.

*To all whom it may concern:*

Be it known that I, BRUNO KNIFFLER, a citizen of the United States, residing at Winchester, in the county of Middlesex and State of Massachusetts, have invented an Improvement in Waterproof Compositions for Coating Paper, of which the following is a specification.

Heretofore various compositions have been employed for coating paper to render it impervious to water, and paraffin-wax has been used largely for this purpose. Considerable difficulty is encountered in applying paraffin-wax in a thin uniform layer on the paper, more particularly when the paper is in large sheets or in a web. Either a thick layer will be applied or a layer which is not of uniform thickness.

This invention has for its object the production of a liquid composition for coating paper which contains paraffin, or equivalent substance, and which may be easily and quickly applied to the paper and will form thereon a thin uniform layer which is impervious to water.

The new composition consists of a liquid ammonium soap composed of stearic-acid, stearin or equivalent, emulsified with an unsaponifiable substance, as paraffin and diluted with water. The composition is applied to the paper in liquid form, after which the water is evaporated, leaving ammonium stearate and paraffin, or their equivalents, as a thin uniform layer on the paper, the molecules of which are commingled and intimately associated together. The composition may be made by a process substantially as described in my application #802,520, filed November 22, 1913, and involves saponifying stearic-acid or equivalent, under pressure by ammonium hydrate at a moderately high temperature in a closed vessel in the presence of water, and emulsifying the paraffin or equivalent with the ammonium soap thus produced, and adding water to the emulsion, thus producing a liquid composition, which is ready for use. Said composition may be composed of say 50-pounds of commercial stearic-acid and 50-pounds of paraffin-wax and 20-pounds of ammonium hydrate and water. The stearic-acid is saponified and the paraffin is emulsified with the saponaceous solution. More water is added subsequently as a diluent to make the emulsion say 10% solid. This composition is applied to the paper by passing the paper through a tank containing it, and then the paper is passed over drying cylinders or heated rolls, thereby to evaporate the water and decompose the ammonium soap, eliminating the ammonium, and leaving a thin layer of stearic-acid and paraffin uniformly deposited on the paper, which renders the paper substantially impervious to water.

I claim:—

1. A wax mixture emulsion containing paraffin wax, ammonium stearate, and water.

2. A wax mixture emulsion containing paraffin wax, an ammonia soap, and water.

3. A wax mixture emulsion containing paraffin wax, an ammonia soap, and water in quantity sufficient to produce a viscous mass with the quantity of ammonia soap used.

In testimony whereof, I have signed my name to this specification, in the presence of two subscribing witnesses.

BRUNO KNIFFLER.

Witnesses:
    B. J. NOYES,
    H. B. DAVIS.